(12) United States Patent
Kaler et al.

(10) Patent No.: US 7,496,602 B2
(45) Date of Patent: Feb. 24, 2009

(54) OPTIMIZING COMMUNICATION USING SCALABLE PEER GROUPS

(75) Inventors: Christopher G. Kaler, Sammamish, WA (US); Gopala Krishna R. Kakivaya, Sammamish, WA (US); Hervey Oliver Wilson, Bellevue, WA (US); Richard L. Hasha, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 272 days.

(21) Appl. No.: 11/325,690

(22) Filed: Jan. 4, 2006

(65) Prior Publication Data

US 2006/0117024 A1 Jun. 1, 2006

Related U.S. Application Data

(63) Continuation-in-part of application No. 11/301,745, filed on Dec. 12, 2005, and a continuation-in-part of application No. 10/956,472, filed on Sep. 30, 2004.

(51) Int. Cl.
*G06F 17/00* (2006.01)
(52) U.S. Cl. ............... 707/104.1; 707/101; 707/102; 707/103 R
(58) Field of Classification Search ............... 707/1–10, 707/100–104.1, 200–206
See application file for complete search history.

(56) References Cited

U.S. PATENT DOCUMENTS 5,483,652 A     1/1996   Sudama

| 5,692,180 A | 11/1997 | Lee |
| 5,831,975 A | 11/1998 | Chen et al. |
| 5,893,116 A | 4/1999 | Simmonds |
| 6,505,244 B1 | 1/2003 | Natarajan |

(Continued)

FOREIGN PATENT DOCUMENTS

WO     WO02056182 A2     7/2002

(Continued)

OTHER PUBLICATIONS

Sun Microsystems, Inc.: An Open-Source Peer-to-Peer Distributed Computing Project Using JXTA, by Jerome Verbeke and Neelakanth Nadgir [online] [retrieved on Feb. 15, 2006]. Retrieved from the Internet URL: http://www.jxta.org/JavaOne/JavaOne2003/jngi.pdf.

(Continued)

*Primary Examiner*—Isaac M Woo
(74) *Attorney, Agent, or Firm*—Workman Nydegger

(57) ABSTRACT

Implementations of the present invention relate in part to optimizations to peer-to-peer communication systems. For example, one implementation relates to use of a smart transceiver that creates, caches, and manages communication channels dynamically between peers. Another implementation relates to use of a central tracking object that can be used to efficiently register and distribute peer messages among the various peers. In one implementation, the central tracking object is shared amongst peers in the group. Still another implementation relates to associating peer groups with namespaces, and for including peer groups of one namespace within still other peer groups of different namespaces. These and other aspects of the invention can also be used to ensure delivery intent of a given peer message is preserved, and to ensure that optimal numbers of messages are communicated to any given peer at any given time.

7 Claims, 6 Drawing Sheets

U.S. PATENT DOCUMENTS

| | | | |
|---|---|---|---|
| 6,546,415 | B1 | 4/2003 | Park |
| 6,553,423 | B1 | 4/2003 | Chen |
| 6,826,182 | B1 | 11/2004 | Parthasarathy |
| 6,848,109 | B1 | 1/2005 | Kuhn |
| 6,965,575 | B2 | 11/2005 | Srikrishna et al. |
| 7,010,534 | B2 | 3/2006 | Kraft |
| 7,016,085 | B2 | 3/2006 | Gonzalez |
| 7,065,784 | B2 | 6/2006 | Hopmann |
| 7,188,145 | B2 | 3/2007 | Lowery |
| 7,206,934 | B2 | 4/2007 | Pabla |
| 2002/0056089 | A1 | 5/2002 | Houston |
| 2002/0141345 | A1 | 10/2002 | Szviatovszki et al. |
| 2002/0147815 | A1 | 10/2002 | Tormasov et al. |
| 2002/0184310 | A1 | 12/2002 | Traversat et al. |
| 2003/0018701 | A1 | 1/2003 | Kaestle et al. |
| 2003/0088620 | A1 | 5/2003 | Kermarrec et al. |
| 2003/0126304 | A1 | 7/2003 | Wyatt |
| 2003/0233455 | A1 | 12/2003 | Leber et al. |
| 2004/0098455 | A1* | 5/2004 | Ellis et al. ............ 709/204 |
| 2004/0148326 | A1 | 7/2004 | Nadgir |
| 2004/0162871 | A1 | 8/2004 | Pabla |
| 2004/0162997 | A1 | 8/2004 | Hopmann |
| 2005/0010660 | A1 | 1/2005 | Vaught |
| 2005/0021617 | A1 | 1/2005 | Rusitschka |
| 2005/0044301 | A1 | 2/2005 | Vasilevsky et al. |
| 2005/0091505 | A1 | 4/2005 | Riley |
| 2005/0105905 | A1 | 5/2005 | Ovadia |
| 2005/0114854 | A1 | 5/2005 | Padisetty |
| 2005/0182856 | A1* | 8/2005 | McKnett ............ 709/248 |
| 2005/0256909 | A1 | 11/2005 | Aboulhosn et al. |
| 2006/0074876 | A1 | 4/2006 | Kakivaya |
| 2006/0117025 | A1 | 6/2006 | Kaler |
| 2006/0117026 | A1 | 6/2006 | Kaler |
| 2006/0167841 | A1 | 7/2006 | Allan |
| 2007/0133520 | A1 | 6/2007 | Kaler |

FOREIGN PATENT DOCUMENTS

| | | | |
|---|---|---|---|
| WO | WO2004039031 | A3 | 5/2004 |

OTHER PUBLICATIONS

Reliable and Secure Group Communication by Deb Agarwal [online] [retrieved on Feb. 15, 2006]. Retrieved from the Internet URL: http://www.doecollaboratory.org/research2/groupcomm/rsgc_scidac_exec_summary_final.pdf.

Department of Computer Science, University of Maryland, College Park: Scalable Peer Finding on the Internet, by Suman Banerjee, Christopher Kommareddy, and Bobby Bhattacharjee [online] [retrieved on Feb. 15, 2006]. Retrieved from the Internet URL: http://www.cs.wisc.edu/~suman/pubs/gi02.pdf.

Collaboration Technologies Group, Distributed Systems Department, Computational Research Division, Lawrence Berkeley National Laboratory: A Scalable and Secure Peer-to-Peer Information Sharing Tool [online] [retrieved on Feb. 15, 2006]. Retrieved from the Internet URL: http://dsd.lbl.gov/P2P/file-share/.

Scalable Application-Level Anycast for Highly Dynamic Groups by Miguel Castro, Peter Druschel, Anne-Marie Kermarrec, and Antony Rowstron [online] [retrieved on Feb. 15, 2006]. Retrieved from the Internet URL: http://project-iris.net/irisbib/papers/druschelanycast/paper.pdf.

Cisco Systems; Configuring ATM Routing and PNNI: Dynamic Versus Static ATM Routing http://www.cisco.com/en/US/products/hw/switches/ps1893/products/configuration_guide_chapter09186a00800f6565.html.

Dynamic Reconfiguration of Network Applications and Middleware Systems in the Bio-Networking Architecture; Abstract; http://www.cs.umb.edu/~jxs/pub/lartes02.pdf.

Performance-Responsive Middleware; Multi-domain Management; http://www.dcs.warwick.ac.uk/research/hpsg/middleware/middleware.html.

Network Technologies; Approach;http://oxygen.lcs.mit.edu/Network.html.

Network Sensitive Reconfiguration of Distributed Applications, Abstract; http://www.cs.rpi.edu/research/pdf/05-03.pdf.

Storage Mutability and Naming in Pasta By Tim D. Moretown, Ian A. Pratt and Timothy L. Harris; University of Cambridge Computer Laboratory; Cambridge, UK; 2002; p. 215.

Explicit Namespaces by Franz Achermann and Oscar Nierstrasz; Software Composition Group, University of Berne; Theoretical Computer Science archive, vol. 331, Issue 2-3 (Feb. 2005); pp. 367-396.

Office action mailed Mar. 18, 2008 cited in related U.S. Appl. No. 10/956,472.

Office Action mailed Aug. 9, 2007 cited in Related U.S. Appl. No. 10/956,472.

Mobility Protocol Framework to Support Multiple Namespaces by Masahiro Ishiyama and Mitsunobu Kunishi; 2003 Symposium on Applications and the Internet Workshops (Saint 2003), Orlando, FL, pp. 208-213.

Office Action mailed Jul. 29, 2008 cited in U.S. Appl. No. 10/956,472.

Office Action mailed Sep. 3, 2008 cited in U.S. Appl. No. 11/301,745 (Copy Attached).

* cited by examiner

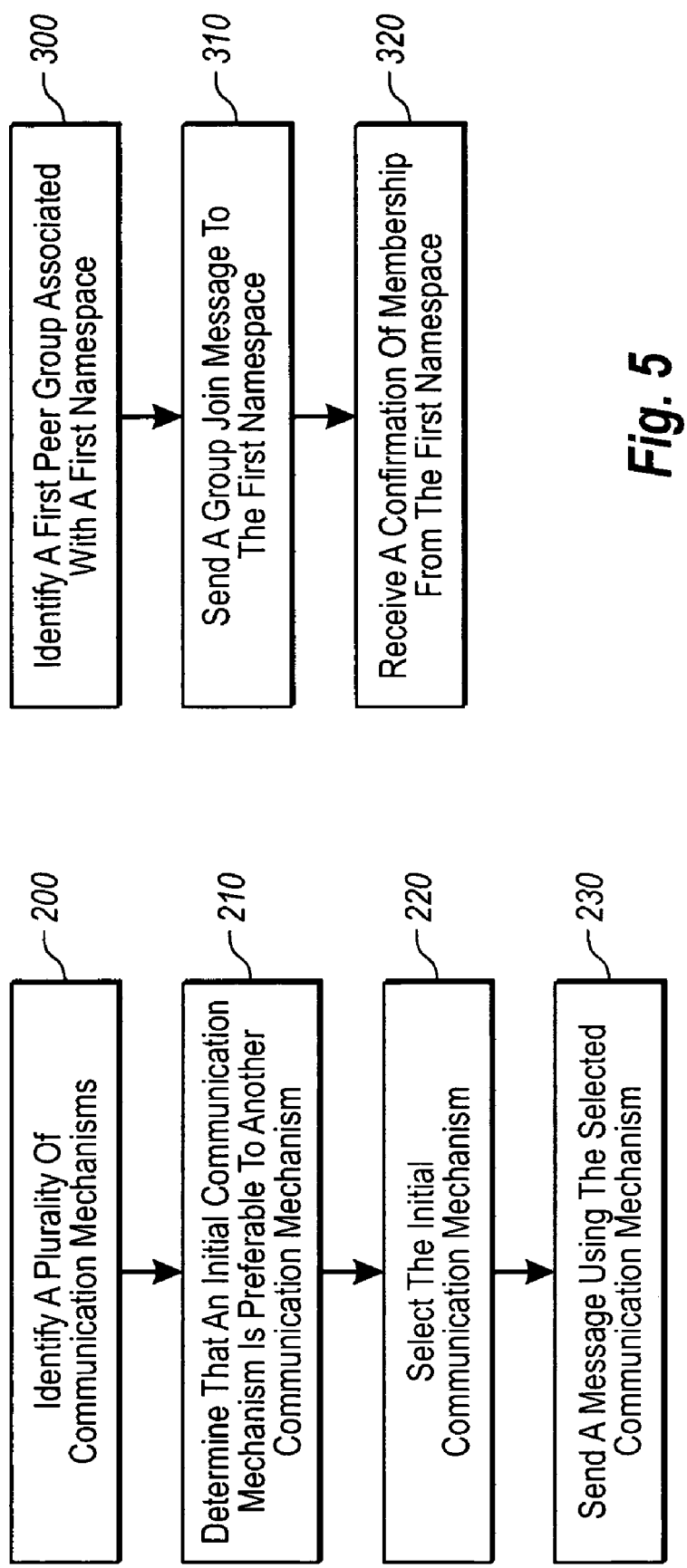

OPTIMIZING COMMUNICATION USING SCALABLE PEER GROUPS

CROSS-REFERENCE TO RELATED APPLICATIONS

This application is a continuation of U.S. patent application Ser. No. 11/325,693, filed on the same day as the present application, and entitled "Optimizing Communication Using Scalable Peer Groups." This application is also a continuation-in-part of U.S. patent application Ser. No. 10/956,472, filed on Sep. 30, 2004, entitled "Organizing Resources into Collections to Facilitate More Efficient and Reliable Resource Access," and of U.S. patent application Ser. No. 11/301,745, filed on Dec. 12, 2005, entitled "Dynamically Adapting Peer Groups." The entire contents of each of the aforementioned patent applications are incorporated herein by reference.

BACKGROUND

Background and Relevant Art

As computerized systems have increased in popularity, so have the needs to communicate with other people and applications associated therewith. In general, computer systems and related devices communicate information over a network for a variety of reasons, for example, to exchange personal electronic messages, sell merchandise, provide account information, to communicate messages from one application to another, and so forth. One will appreciate, however, that as computer systems and their related applications have become increasingly more sophisticated, the challenges associated with communicating messages on a network have also increased.

Generally, there are a number of different protocols and topologies for communicating messages from one computer system to the next over a network. One conventional topology, such as used with electronic mail ("email") and some instant messenger systems, uses one or more centralized messaging servers to manage and verify user information, and also to route user messages sent from one computer system to the next. In this example, one computer system logs in to the centralized message server and sends a message addressed to another user or computer system. The centralized server receives the addressed message, verifies user information, and sends the message addressed to the computer system (or user).

Another conventional topology uses a peer-to-peer framework to send messages directly from one computer system to the next. That is, one computer system (i.e., one "peer" or "peer computer system") might connect directly to another computer system (i.e., another "peer" or "peer computer system"), and then send messages directly to the other peer computer system. Conventional peer connections such as these might also have several other connections with multiple different other peer computer systems. In particular, one peer might also be connected to multiple other peers in the communication network, and might further be connected to a defined "group" of multiple peers.

Conventional peer communication frameworks such as these, however, are more limited in many ways in how they facilitate communication compared with conventional email or instant messaging systems. For example, conventional peer communication frameworks do not typically allow for groups to include other groups. That is, a peer group typically comprises a membership of one or more peer computer systems, but does not typically include in its membership a single entity (e.g., an address or object) representing another group, without perhaps separately addressing all members of that other group.

Conventional peer communication frameworks also typically have few—if any—services that adequately or intelligently regulate the number and means for communicating certain messages. For example, one peer might send a message to a couple of other peers in a defined group. The recipient peers might further relay the message to a few other peers in the group without discriminating who originally sent the first message. As such, the original sending peer might receive several copies of the original message from other members of the peer group.

In addition, conventional peer frameworks do not efficiently—if at all—distinguish how, when, or if the user received an answer to the query. For example a user might want to send a query to several members of a peer group, but only needs to receive the correct answer once. Nevertheless, unless the peer group members are sent another message of some sort that the query has been satisfied, each peer group member might think that there has not yet been a response to the query, and thus continue to respond. As a result, the user could conceivably get several iterations of the same answer from multiple peers in a group for only a single question. Along these lines, a conventional peer communication framework also does not typically distinguish one peer member from the next inside a peer group very well. For example, a peer might need to transmit certain information only once to one member of a peer group, such as to join the peer group, but not want (or need) to communicate that information to all members of the peer group. Unfortunately, conventional peer frameworks do not allow for this type of constraint.

One can appreciate, therefore, that a conventional peer communication framework might have many unnecessary copies of messages floating around the network in various stages. That is, there may be many unnecessary message duplicates being sent around a peer network due to failures of distinguishing between peers, or whether peers have originated or received a message, such as in the scenarios just described. In other cases, the peer communication framework might be clogged with messages sent using a certain communication mechanism that is inappropriate for a given context, where the end-user might not be even able to access the peer-to-peer message.

For example, a peer communication framework might use a Hypertext Transfer Protocol ("HTTP") mechanism for sending messages to a user based on some initial connection information. If the user leaves the local computer system (i.e., walks out of a building), however, it may be more efficient to communicate the message to the user's mobile phone using a Short Message Service ("SMS") communication mechanism. Nevertheless, a conventional peer communication framework will not automatically adjust its chosen communication mechanism to accommodate a change in presence. In particular, the peer communication framework will typically use an "all-or-nothing" approach, and remain only with an initially chosen communication mechanism, regardless of whether another communication mechanism might be more appropriate at a later time. One can appreciate that the failure to appropriately modulate how many and what messages are being sent can result in taxing the peer communication framework.

Another aspect of conventional peer communication frameworks is that they do not normally take possible constraints into account (e.g., hardware, software, or both) when distinguishing "listening" and "sending" behavior at a peer.

For example, a sending peer may want to only broadcast information, as in the case of distributing stock quotes, while a listening peer might want to only listen to the broadcast information, as in the case of simply viewing a stream of the stock quotes. The sending and listening peers each might further be using two different types of communication channels with different capabilities. For example, one communication channel might have a fast upload speed and slow download speed, while another communication channel might have an equal but moderately fast upload and download speed. Conventional peer frameworks, however, typically do not determine appropriate communication channels (or other hardware or software determinations) based at least in part on the type of peer behavior, or appropriately adjust the determination after establishing a peer connection.

Accordingly, conventional peer-to-peer communication can be optimized for a wide variety of considerations.

BRIEF SUMMARY

Implementations of the present invention solve one or more problems in the art with systems, methods, and computer program products that optimize peer-to-peer communication. In particular, implementations of the present invention include peer communication groups to which peers can subscribe and publish, and of which other peer groups can be members. Implementations of the present invention also include components that can intelligently and dynamically select an appropriate one of many different communication channels for a given context. Implementations of the present invention further include components that ensure that an optimal number of messages are communicated to or from any given peer.

For example, one method in accordance with an implementation of the present invention for dynamically adjusting a communication mechanism involves identifying a plurality of communication mechanisms for communicating a peer message from a peer computer system to a recipient peer computer system. In addition, the method can also involve automatically determining that an initial communication mechanism of the plurality of communication mechanisms is preferable to another communication mechanism of the plurality of communication mechanisms. Upon making this determination, the method further involves automatically selecting the initial communication mechanism, and sending the peer message to the recipient computer system using the selected initial communication mechanism.

Another alternative method in accordance with an implementation of the present invention for managing peer group communication within a network namespace involves identifying a first peer group of one or more peers, where the first peer group is associated with a first namespace. In addition, the method also involves sending a group join request message to the first namespace, as well as receiving a confirmation message from the first namespace that membership in the first peer group has been accepted. As such, the peer has been added to a membership list of the first peer group, and the peer is subscribed to the first namespace.

A further alternative method in accordance with an implementation of the present invention for optimizing communication of peer messages involves receiving a peer message over a peer-to-peer communication network from an originating peer, where the peer message includes one or more delivery constraints. The peer can then reference a central tracking object, which indicates at least that one or more peers have received the peer message, and that the originating peer sent the peer message. The method further involves evaluating the one or more delivery constraints for the peer message, and sending a peer response message based on the indication referenced from the central tracking object, as well as based on the evaluation of the one or more delivery constraints. As such, the method can preserve the delivery intent of the originating peer with this message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates a flowchart of a method comprising a sequence of acts in accordance with an implementation of the present invention for sending a message using a selected communication mechanism;

FIG. 5 illustrates a flowchart of a method comprising a sequence of acts in accordance with an implementation of the present invention for sending a message to a group associated with a namespace.

DETAILED DESCRIPTION

Figure 1A:
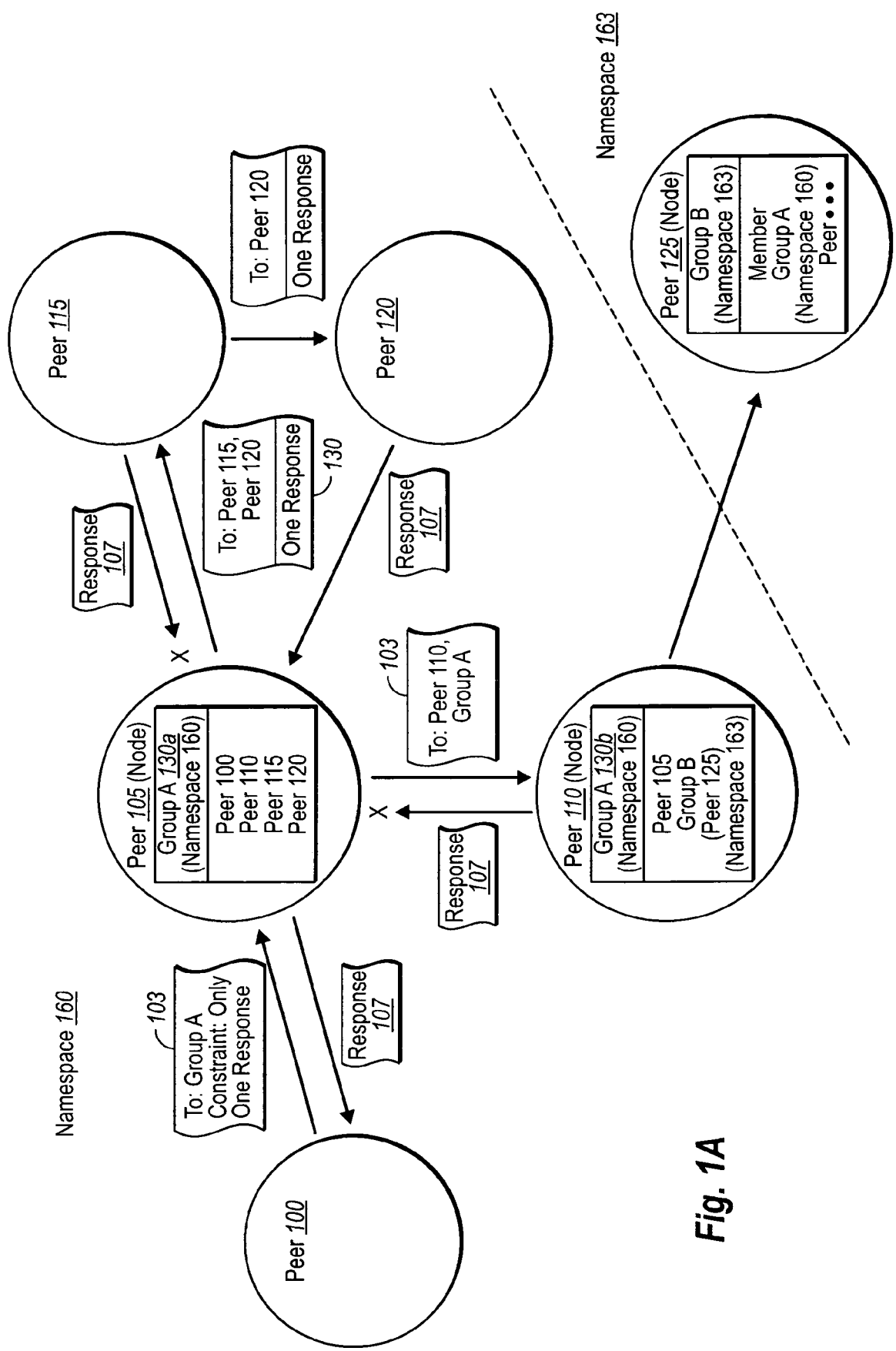
FIG. 1A illustrates an overview schematic diagram of a peer-to-peer communication system in which a peer sends a directed message to a group of peers in accordance with an implementation of the present invention.

The present invention extends to systems, methods, and computer program products that optimize peer-to-peer communication. In particular, implementations of the present invention include peer communication groups to which peers can subscribe and publish, and of which other peer groups can be members. Implementations of the present invention also include components that can intelligently and dynamically select an appropriate one of many different communication channels for a given context. Implementations of the present invention further include components that ensure that an optimal number of messages are communicated to or from any given peer.

For example, at least one aspect of the present invention involves use of a peer group, which is generally a subscription point that does not necessarily need a centralized administrator. In particular, each member (or "peer") of a given peer group can be thought of as a member of a namespace to which group member peers can each subscribe and publish. The peer group can belong to still another group, and can also have a different peer group as one of its group members. Applications at the given peer's computer system can then view each peer group in terms of a subscription/publication model.

In addition, aspects of the present invention involve use of a smart transceiver component that dynamically selects an appropriate communication mechanism for any given communication scenario, at any point in time. For example, and as will be discussed more fully herein, a smart transceiver component can interface between an application component at a peer's computer system and one or more communication mechanisms, such as the traditional HTTP, SMS, or TCP mechanisms, as well as other communication mechanisms such as Radio Frequency ("RF"), infrared, shared memory, and/or serial port components. Those skilled in the art will understand that many different kinds of communication can be used.

At any point during communication with one or more peers, the smart transceiver component at the sending communication system can select (and/or adjust to) any of the communication protocols. The smart transceiver component can also dynamically change to (or include) another communication protocol if found to be appropriate at a later point, depending on any number of factors, to help make the communication as effective as possible. In addition, the smart transceiver component can cache and reuse communication channels so that the computerized system does not need to open multiple different communication channels to communicate with the same peer.

Aspects of the present invention can further optimize send and receive communication channels based on the behavior of a given peer. For example, a smart transceiver component can identify when a peer is configured primarily for "listening," or primarily for "sending" peer messages. If the peer is configured primarily to listen, then the smart transceiver component might select communication protocols and hardware ports that have higher download throughput and speed. Similarly, if the peer is configured primarily to send, then the smart transceiver component might select other communication protocols and hardware ports that have higher upload throughput and speed.

Still further aspects of the present invention include a number of optimizations that can help ensure that appropriate numbers or copies of a given message are communicated in the peer communication fabric. For example, and as will be detailed more fully hereinafter, a central tracking object at each peer's computer system can be used to track messages sent between users, and sent over different communication channels. In particular, the central tracking objects can help ensure, for example, that sending peers do not receive copies of their own messages, or that other peers do not receive duplicate copies of the same message.

These and other aspects of the present invention can be further used to provide a number of additional features to a peer communication framework. For example, aspects of the present invention can be used to send one message to a group with the constraint that the message be sent only to "any one" peer in a group. Aspects of the present invention can also be used to ensure receipt of only one response message after having sent a query to, for example, all peers in a given group, thereby avoiding unnecessary duplicates.

Referring now the Figures, FIG. 1A illustrates a peer-to-peer communication system, which includes a peer 100 that is in communication with peer 105, which is in further communication (e.g., has a communication channel) with peer 110, peer 115, and peer 120. Peer 115 is also in communication with peer 120, while peer 110 is also in communication with peer 125 in a separate namespace. Thus, the illustrated communication system shows that one or more peers (e.g., 105, 110) can also be "node" peers. These node peers can serve a hybrid function similar to a centralized server for routing peer messages, or can act as typical end-peers that simply exchange messages back and forth with another peer.

For example, node peers 105 and 110 both store at least a portion of a group list for Group A. In particular, peer 105 stores group list 130*a*, which includes peer 100, 110, 115, and 120; while peer 110 (a node peer) stores list 130*b*, which includes peer 105 and Group B (via peer 125) in its membership. In one implementation, each portion of the group list is stored as a hash table.

In any event, group list ownership/management can allow peers 105 and 110 to also route (forward, or "chain") peer messages addressed to peers in their relevant group list. For example, if peer 105 received a message directed to Group B (via peer 125), peer 105 would check its group list membership and determine that it does not have a record for Group B, but that the record might be found on another portion (i.e., 130*b*) of the group list, and thus forward the request to peer 110, which peer 105 knows is hosting the rest of the group list. Alternatively, the list portion 130*a* hosted by peer 105 might hold information that indicates that the list portion 130*b* hosted at peer 110 includes a record for Group B. As will be discussed more fully hereinafter, peer 110 could then receive the message and send the message to the corresponding peer 125 that is hosting the group list for Group B. One way that this can be done is by sending or publishing the message to a certain "namespace."

For example, FIG. 1A shows that the illustrated peers can be associated with certain namespace 160, 163 divisions. In general, a namespace identifies a set of names in hierarchical format to avoid ambiguity when objects of different origins—but the same name—are mixed together. Since namespaces can be identified by Uniform Resource Identifiers ("URI"), and since peers can also be identified by URIs, peer groups can also be associated with a unique namespace addressed by a URI. Accordingly, FIG. 1A shows that peers 100, 105, 110, 115, and 120 are part of the same Group A in namespace 160, while peer 125 is part of namespace 163. That is, each of peers 100, 105, 110, 115, and 120 are addressable by a URI in the same namespace 160, while peer 125 is addressable by a URI in a different namespace 163. Each peer in turn can send messages to the group by publishing to the associated namespace. Similarly, peers can join a group by sending a group join request to the associated namespace.

In addition, FIG. 1A shows that a peer group from one namespace (e.g., 163) can also be a member of a different peer group from a different namespace (e.g., 160). For example, FIG. 1A shows that group lists 130a-b are associated with namespace 160. Group list 130b, however, has "Group B" in its membership. Group list 130b further shows that Group B is addressable through peer 125 in namespace 163. Accordingly, messages sent to the general Group A membership of namespace 160 will also be forwarded or chained to the Group B membership of namespace 163.

In general, there are a number of ways in which one peer group of one namespace can be added to another peer group of a different namespace. In one implementation, one group (e.g., of namespace 163) is queried for peer membership (e.g., by peer URIs in a namespace), and those discovered peers are added to the membership of the group making the request (e.g., of namespace 160). Each peer can then send and chain messages received as they would have in their prior group before being added to the new group. In another implementation, one group can be added to another group by creating a namespace bridge between the two associated namespaces (i.e., namespace 160 and 163). In still another implementation, a context can be associated with specific peer conversations, allowing the conversations to be mixed across peer groups and still be organized by recipients. For example, a message attribute might say "conversation 23" or might even be more specific and say "group A conversation Y."

In addition, FIG. 1A provides an overview of how one peer can send a message to a group of peers with particular constraints on how messages are sent, or from whom responses are received. For example, FIG. 1A shows that peer 100 sends message 103 with the constraint that "only one response" be received. That is, an application at peer 100 computer system might need only one generic piece of information, such as date and time, and does not care about from whom peer 100 receives the response message. Nevertheless, peer 100 would like to send the message to as many group members as necessary until an appropriate response is received.

Accordingly, FIG. 1A shows that peer 100 sends message 103 to peer 105, which is a node peer. Peer 105 examines its group membership to verify the membership record for peer 100, and to identify peers for relaying the message. Peer 105 also identifies whether it can answer the message 103. For example, peer 105 may not have appropriate resources or bandwidth available for answering message 103, or may simply be unaware of the appropriate answer. Accordingly, FIG. 1A shows that peer 105 forwards the message to peer 110 and to peer 115. Because peer 115 also has a peer connection with peer 120—and because peer 115 will relay group messages to peer 120—peer 105 does not need to send another copy of message 103 to peer 120. For similar reasons, because peer 105 knows that peer 110 is a node for the remainder of the group list for "Group A," peer 105 can simply send message 103 addressed to peer 110, further noting that the message is to be sent to any other members of "Group A."

In this example, peer 120 sends response 107 back to peer 100 via peer 105 before peer 115 and peer 110 do so. In some cases, this might have occurred before peer 105 sends message 103 to peer 110 (which would render message 103 to peer 110 unnecessary). When receiving response 107 from peer 120, however, peer 105 is able to note the response, such as by making an entry into a "central tracking object" discussed more fully in the following Figures (e.g., FIG. 2). Furthermore, since peer 100 required only one response, peer 105 identifies this constraint, and simply forwards response 107 from peer 120 to peer 100, while dropping responses 107 from peers 110 and 115 respectively. As such, peer 105 can ensure peer 100 only receives one response, as originally requested.

Figure 1B:
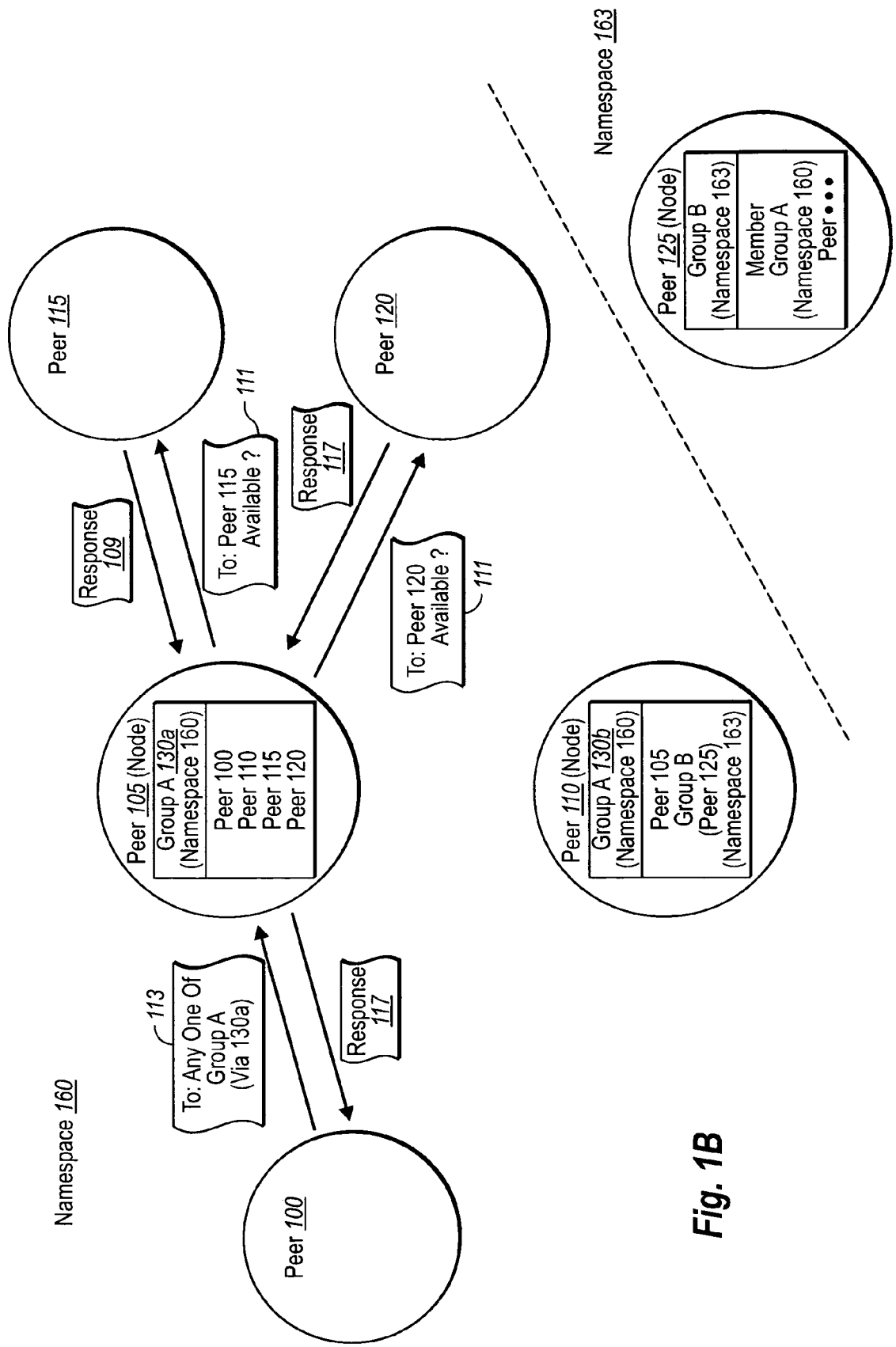
FIG. 1B illustrates another schematic diagram, as shown in FIG. 1A, in which a peer sends a directed message to a group of peers.

FIG. 1B illustrates a scenario similar to that shown in FIG. 1A, albeit showing another constraint placed by peer 100 on message delivery. In particular, FIG. 1B shows that peer 100 constrains message 113 to be sent to "any one" of Group A. For example, an application at the peer 100 computer system might want to send "presence" information to any generic member of a peer group, but not need to send this to all members of the group. The presence information might be accessible to other peers in the group without having to necessarily each receive message 113 from peer 100. Accordingly, FIG. 1B shows that peer 100 sends message 113 to peer 105, a "target" peer, which also happens to be a node peer in this case.

There can be many ways in which one peer automatically selects a target peer to which to send message 113. For example, peer 100 might take into account proximity information, and determine the nearest and/or farthest network locations of other peers in Group A. This information can also be used to generate a potential class or set of recipients, such as recipients at one network location compared with recipients at another network location. In one implementation, the information includes such selection criteria as lowest id, highest id, fixed identifier, random identifier, lowest bandwidth or processing load, or some other dynamically accessible criteria.

Peer 100 can also create corresponding exclusion lists, in addition to any such acceptable recipient lists. In particular, peer 100 can constrain message 113 so that it is addressed to "any one of Group A within X domain, but not any one of Group B within Y domain." Accordingly, aspects of the present invention can provide for greater scale in scenarios such as cache replication, where data may be needed from another peer (e.g., 115, 120), but where the selection of the "class" of peer is important, and the message (e.g., 113) need not therefore be replicated to all peer members.

In any event, and as previously described, FIG. 1B shows that message 113 is addressed to any one of Group A (via 130a), which limits distribution of message 113 to any of peer 115 or peer 120, which are found on the group list 130a. Thus, when peer 105 receives message 113, peer 105 does not have an appropriate response, and so identifies whether to pass message 113 to another peer. This determination can be based on any of the parameters identified above, as well as on bandwidth or resource considerations. Thus, for example, FIG. 1B shows that peer 105 asks peer 115 in a new message 111 (which contains content from message 113) if it is available to respond, to which peer 115 responds 109 in the negative. Peer 105 then sends the same query 111 to peer 120, and receives a response 117, which peer 105 then chains (or forwards) back to peer 100. Thus, FIG. 1B shows how peer 105 can help ensure that the constraint of sending to "any one," made by peer 100, is met. In particular, FIGS. 1A through 1B illustrate a number of ways in which groups and peers within groups can be organized, and can manage message delivery with a number of optimizations and/or constraints.

Figure 2:
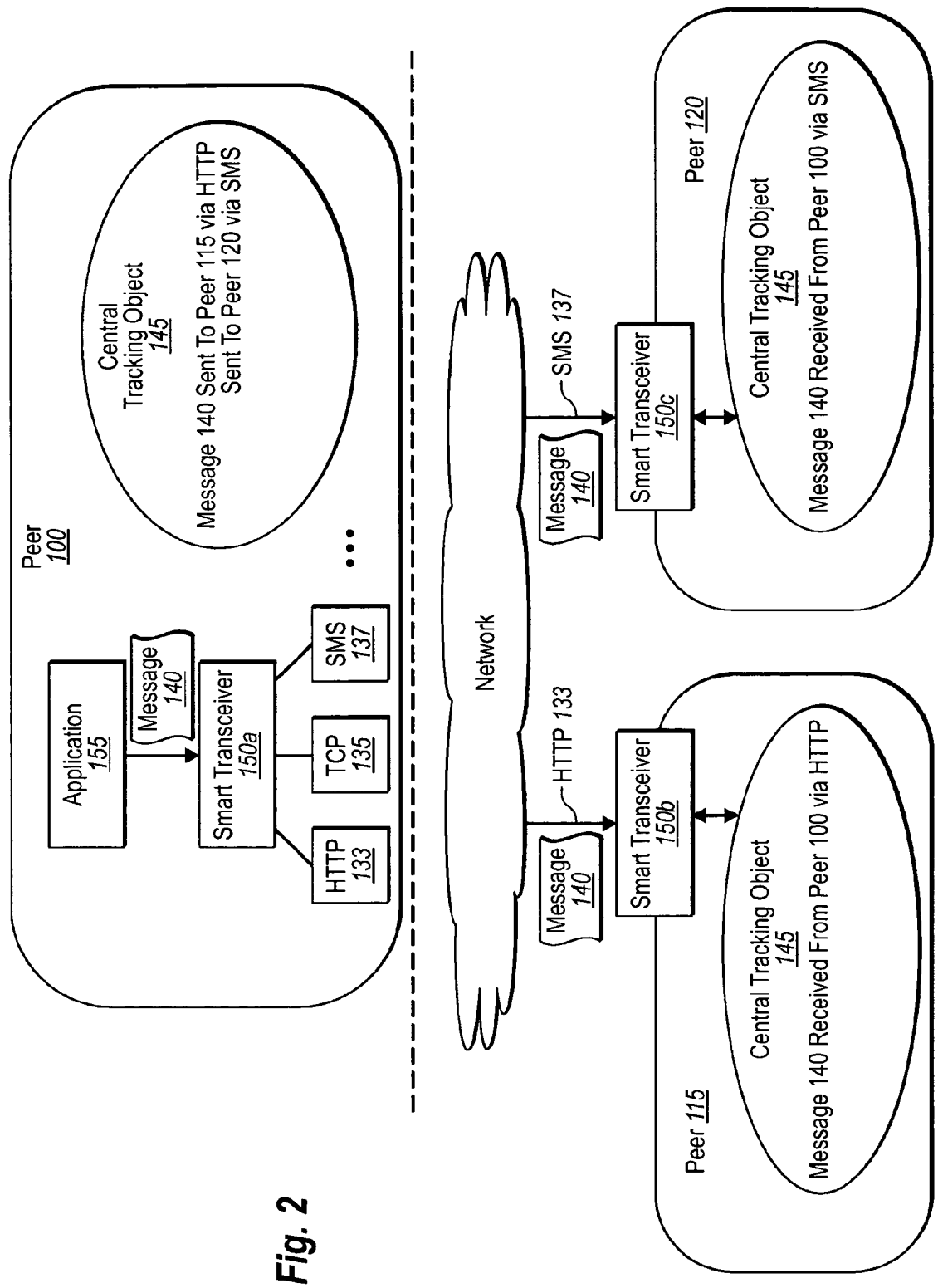
FIG. 2 illustrates an overview schematic diagram of a peer-to-peer communication system in which a peer sends messages using a smart transceiver and a central tracking object.

FIG. 2 illustrates a more detailed schematic diagram of one or more of the components that can be used to help enable these organizational optimizations in accordance with implementations of the present invention. For example, FIG. 2 illustrates a central tracking object 145, which can be used to share message sending and receiving annotations among a plurality of peers in a select group. In one implementation, central tracking object 145 can be stored at least in part on a peer node (e.g., peer node 105, 110) in a designated share partition. Registration updates to the central tracking object 145 can then be pushed to (or pulled from) any of the other peers in the peer-to-peer communication system as needed or configured by a peer user.

For example, FIG. 2 shows that the information managed by central tracking object 145 at peer 100 can also be shared in the tracking objects associated with peers 115 and peer 120. In one implementation, central tracking object 145 is a single object that each peer shares across different transport input and output processors at the respective peer, while in alternative implementations (not explicitly shown), each peer can have ownership of an independent, essentially distinct tracking object. For simplicity in description, however, FIG. 2 illustrates that each of peers 100, 115, and 120 share at least a portion of central tracking object 145. When peer 100 sends message 140 to peer 115 and peer 120, FIG. 2 central tracking object 145 at peer 100, as well as object 145 at peers 115 and 120, can record the fact that peer 100 sent message 140. Sharing and/or distributing information in this way can enable any number of messaging optimizations, such as by registering sent and received messages.

For example, as in FIG. 1A, when peer 105 receives multiple responses 107, peer 105 can identify from a central tracking object (e.g., 145) that response 107 has already been received from peer 120 and sent to peer 100, and thus use this information to drop duplicate response 107 from peers 110 and 115. Similarly, as shown in FIG. 1B, peer 105 can consult a central tracking object (e.g., 145) to determine which of the peers in Group A peer 105 has already tried to hand off message 113 under the constraint of "send to only one," and so forth. Accordingly, registration through the central tracking object 145 can provide at least one mechanism configured for filtering duplicates, as well as use of black lists, white lists, and/or identification of failure information, etc., which can then be used by a smart transceiver 150a-c at higher levels of a communication channel.

For example, FIG. 2 shows that peer 100 can include a smart transceiver component 150a. Smart transceiver 150a is an individualized component that is also found in other peers in the peer-to-peer communication system, such as shown for transceiver 150b on peer 115 and transceiver 150c on peer 120. Generally, smart transceiver 150a can be used to interface between an application component 155 and one or more communication mechanisms 133, 135, and 137, and then making certain message sending and receiving determinations based on a variety of system constraints or properties (e.g., hardware, software, network issues, etc.)

In particular, smart transceiver (i.e., 150a-c) can dynamically determine at anytime in a communication process what the more effective communication mechanism might be based on any number of dynamically determined factors. In one implementation, for example, smart transceiver 150a can cache application channels (e.g., via communication mechanisms 133, 135, 137, etc.) so that established security and other application-level logic need not be reestablished (within time windows). Smart transceiver 150a-c can also make use of various identities and other network throughput or processing considerations, and select an established or preferred communication mechanism. Along these lines, smart transceiver 150a-c can also monitor network failure activities, as well as any other network changes, including network policy changes or updates. Such information dynamically determined by smart transceiver 150a-c can allow the given transceiver to dynamically adjust which communication mechanisms or channels are used.

By way of example, suppose that a peer distribution system (or any communication mechanism) establishes a communication channel via any of communication mechanisms 133, 135, or 137 to a specific endpoint peer (e.g., peer 115). The smart transceiver 150a at peer 100 initiates the connection based on the most appropriate factors with another smart transceiver at the given endpoint peer (e.g., transceiver 150b at peer 115), and then caches the connection state (i.e., "communication channel.") Since the connection is still made through the application component of the communication channel, important application connection semantics can be retained when switching to another communication mechanism (a lower level of the communication channel) based later on a more appropriate connection mechanism.

As such, communication channels can be used (or re-used) based on any existing network policy and/or constraints in the message (e.g., 140) being sent. For example, a user, such as peer 100 at an appropriate computer system (e.g., personal computer, cellular phone, etc.) might initially connect to another peer 115 to send a message. Peer 100 might initially detect through smart transceiver 150a certain "presence" information, which suggests that the user at peer 115 is connected to the network through a land-line. Accordingly, smart transceiver 150a might initiate a communication channel by connecting to peer 115 via smart transceiver 150b using an HTTP communication mechanism 133. The user at peer 115, however, might exit the land-line computer system at a later point, and thus be subsequently available only via wireless communication means. Accordingly, smart transceiver 150b might transmit this change in presence information for the user to transceiver 150a at peer Smart transceiver 150a might then automatically determine that the user (peer 115) is better reachable through a different communication mechanism, such as an SMS communication mechanism 137. Accordingly, the smart transceiver 150a uses the cached communication channel originally set up over the HTPP mechanism 133, and duplicates the communication channel over the now-preferred SMS communication mechanism 137. As a result, new messages sent through application 155 to peer 115 are now communicated via SMS.

In one or more alternate implementations (not shown), smart transceiver 150a could also create multiple communication channels for delivering a particular message, as it is deemed appropriate. For example, smart transceiver 150a could determine that, given the urgent nature of a particular message, it would be efficient to create multiple communication channels, to thereby ensure the user receives the given message. In such a case, for example, smart transceiver 150 could detect user presence via multiple communications paths, and then initiate corresponding multiple communications channels.

Figure 3:
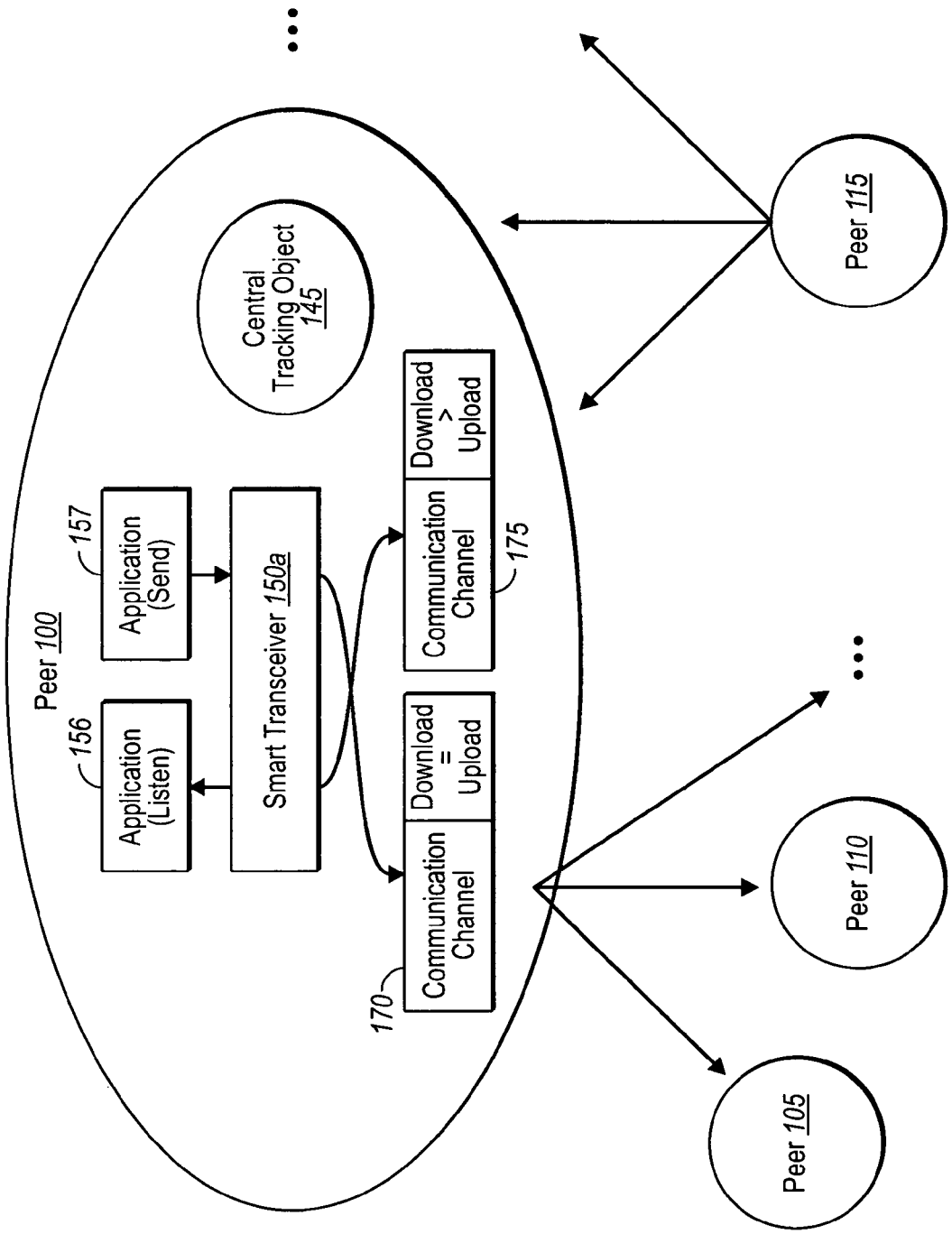
FIG. 3 illustrates the schematic diagram shown in FIG. 2, wherein the smart transceiver differentiates sending and listening functionality.

FIG. 3 illustrates another implementation in accordance with aspects of the present invention in which smart transceiver component 150a can be used to dynamically manage incoming and outgoing peer-to-peer messages. In particular, FIG. 3 illustrates an implementation in which peer 100 is communicating messages using applications 156 and 157, which are operating with primarily listening or sending behaviors, respectively. For example, application 156 is configured to receive and display continuously streamed stock quotes from peer 115, while application 157 is configured to stream video data to one or more other peers 105 and 110. Communication channels 170 and 175, however, have differing capabilities. In particular, communication channel 170 has an approximately equal upload and download configuration, while communication channel 175 has a faster download but slower upload configuration.

Accordingly, the smart transceiver 150a, which interfaces between applications 156 and 157 and communication channels 170 and 175, can determine the common behavior of the application at any given time, and then make an appropriate determination of which communication channel to use. For example, FIG. 3 shows that smart transceiver 150a chooses communication channel 170 to be used with application 157 (sender), since communication channel 170 has a relatively fast upload speed compared with channel 175. Similarly, FIG. 3 shows that smart transceiver 150a chooses communication channel 175 to be used with application 156 (listener), since communication channel 175 has a relatively faster download speed compared with channel 170. It will be understood, however, that the smart transceiver 150a can switch these communication channel determinations at a later point if necessary, or if aspects of the communication channels 170-175 change for some other reason.

Accordingly, FIGS. 1A through 3, and the corresponding description, illustrate a number of components and mechanisms for optimizing and scaling peer-to-peer communication systems. Implementations of the present invention can also be described in terms of acts in a method for performing a particular function. In particular, FIGS. 4 and 5 illustrate flowcharts of acts in a method for sending a message using a dynamically selected communication mechanism, and for sending a message to a group associated with a namespace, respectively.

For example, FIG. 4 shows that a method of dynamically adjusting a communication mechanism used by a peer comprises an act 200 of identifying a plurality of communication mechanisms. Act 200 includes identifying a plurality of communication mechanisms for communicating a message from a peer to a recipient peer. For example, FIG. 2 shows that smart transceiver 150a at peer 100 has communication mechanisms 133, 135, and 137 at its disposal for creating a communication channel to communicate with another peer (e.g., peer 115).

In addition, FIG. 4 shows that the method comprises an act 210 of determining that at least one initial communication mechanism is preferable to another communication mechanism. Act 210 includes automatically determining that at least one initial communication mechanism of the plurality of communication mechanisms is preferable to another communication mechanism of the plurality of communication mechanisms. For example, smart transceiver 150a identifies presence information regarding the user at peer 115, such that the user is present at a land-line-connected computer system. Accordingly, and based on any other relevant factors (e.g., proximity, network location, relevant applications, time of day, etc.), the smart transceiver 150a determines an HTTP communication mechanism 133 would be more appropriate than, for example, an SMS communication mechanism 133.

FIG. 4 also shows that the method comprises an act 220 of selecting at least one initial communication mechanism. Act 220 includes automatically selecting at least one initial communication mechanism. For example, upon determining that the HTTP communication mechanism 133 is more appropriate, the smart transceiver 150a creates a communication channel between applications at peers 100 and 115 using the HTTP communication mechanism 133. Alternatively, if the SMS communication mechanism 137 is more appropriate at a later time, the smart transceiver 150a takes a cache of the communication channel initially created for the HTTP communication mechanism 133, and applies it to the SMS communication mechanism 137.

Furthermore, FIG. 4 shows that the method comprises an act 230 of sending a messaging using at least one of the selected communication mechanisms. Act 230 includes sending a message to the recipient peer's computer system using at least one of the selected initial communication mechanisms. For example, application 155 at peer 100 sends message 140 through the communication channel created using the HTTP communication mechanism 133 to a corresponding application (not shown) at peer 115. The specifics of the communication channel, however, are abstracted away from the application layer itself, and are handled by the smart transceiver component 150a. Thus, if the underlying communication mechanism changes, the application is effectively unaware of this change, and simply sends messages through the communication channel established by the smart transceiver 150a.

FIG. 5 illustrates an alternative method in accordance with aspects of the present invention for peer group communication within a network namespace. In particular, FIG. 5 shows that the method comprises an act 300 of identifying a first peer group associated with a first namespace. Act 300 includes identifying a first peer group of one or more peers, the first peer group being associated with a first namespace. For example, peer 100 identifies "Group A" of peers, which includes peers 105, 110, 115, and 120, and identifies that Group A is associated with namespace 160. As such, it is understood that joining Group A will involve joining namespace 160.

In addition, the method of FIG. 5 comprises an act 310 of sending a group join message to the first namespace. Act 310 includes sending a group join request message to the first namespace. For example, peer 100 sends a group join request message (not shown) to namespace 160. This message might then be handled by the most appropriate peer node in the namespace for handling the request, such as peer node 105 or peer node 110, which stores a hash of at least a portion of the group list (i.e., 130a or 130b).

Furthermore, FIG. 5 shows that the method comprises an act 320 of receiving a confirmation of membership from the first namespace. Act 320 includes receiving a confirmation from the first namespace that membership in the first peer group has been accepted, such that the peer has been added to a membership list of the first peer group. For example, peer node 105, which is storing at least a portion of the "Group A" membership hash table (103a), replies on behalf of namespace 160 to peer 100 that membership has been accepted. Along similar lines, peer node 110 sends a group join request message on behalf of namespace 160 to namespace 163 in order to add "Group B." Peer 125, which is a node in "Group B" (and hence of namespace 163), then responds with a confirmation to peer node 110, and thus allows for the construction of a namespace bridge between Groups A and B. Alternatively, acceptance of the group join request might provide a vehicle for the peer 110 node to query the Group B membership, and include URIs for each Group B peer member in the hash table 130b list for Group A.

Figure 6:
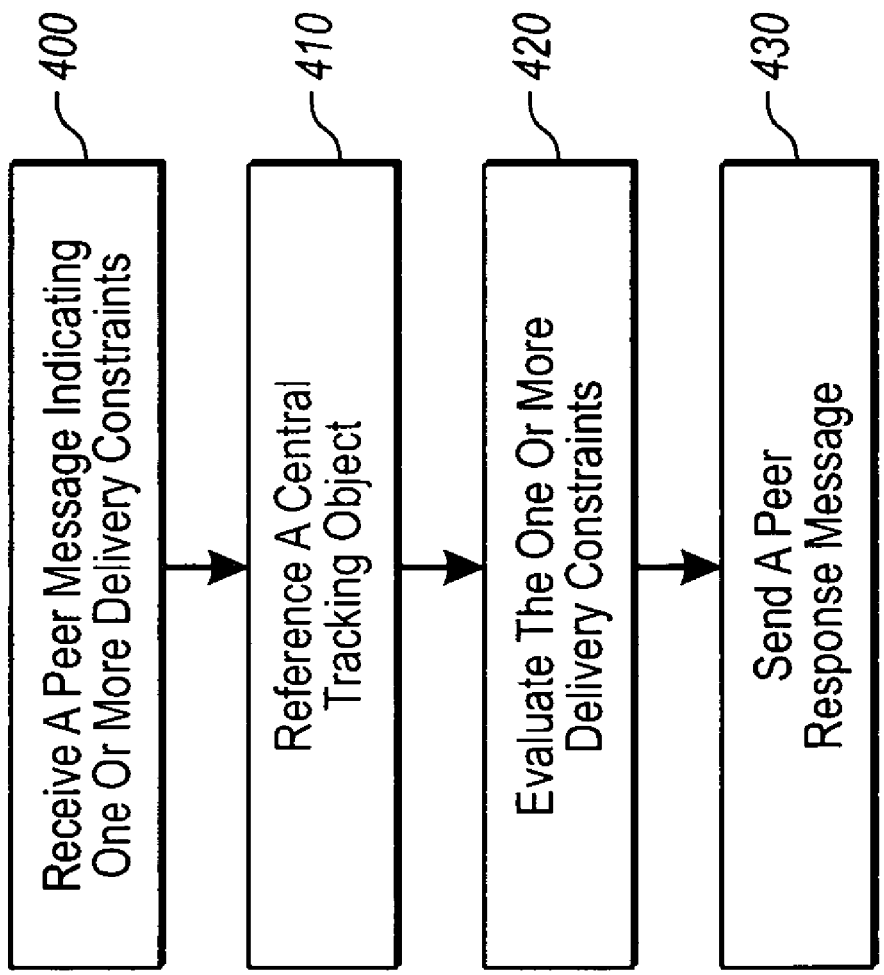
FIG. 6 illustrates a flowchart of a method comprising a sequence of acts in accordance with an implementation of the present invention for delivering a peer message with one or more delivery constraints.

FIG. 6 illustrates another alternative method in accordance with an implementation of the present invention for optimizing communication of peer messages among one or more peers in the peer group based on one more delivery constraints. In particular, FIG. 6 shows that the method can comprise an act 400 of receiving a peer message indicating one or more delivery constraints. Act 400 includes receiving a peer message over at least one peer-to-peer communication channel from an originating peer, the peer message indicating one or more delivery constraints. For example, peer 100 sends message 103, which includes the constraint that "only one response" is needed. Similarly, peer 100 sends message 113, which constrains the message to be sent to "any one" of Group A.

FIG. 6 also shows that the method comprises an act 410 of referencing a central tracking object. Act 410 includes referencing a central tracking object, the central tracking object indicating at least that one or more peers have received the peer message and that the originating peer sent the peer message. For example, peer 105 receives message 103 (FIG. 1A) and consults central tracking object 145 (FIG. 2) to determine that the message 103 has only been sent by peer 100 and has not yet been received by any peer other than peer 105. The central tracking object 145 can also indicate that message 103 has only been sent via an HTTP communication mechanism 133.

In addition, the method comprises an act 420 of evaluating the one or more delivery constraints. Act 420 includes evaluating the one or more delivery constraints for the peer message. For example, peer 105 identifies the constraint in message 103 that the message only needs one response. Furthermore, peer 105 identifies from the central tracking object 145 that no other peers have yet provided a response to message 103. Similarly, peer 105 identifies from the central tracking object 145 that no other peers that should receive message 113 have yet received message 113. Alternatively, peer 105 identifies that no other peers that can respond to message 113 have yet received message 113.

As such, FIG. 6 further shows that the method comprises an act 430 of sending a peer response message. Act 430 includes sending a peer response message based on the indication referenced from the central tracking object, and based on the evaluation of the one or more delivery constraints, such that a delivery intent of the originating peer is preserved. For example, peer 105 sends response 107 to peer 100, and registers this action in central tracking object 145 (e.g., FIG. 2). As such, any other responses 107 received by peer 105 to message 103 will be dropped at least by peer node 105, as well as any other peer that has access to central tracking object 145. Similarly, peer 105 registers an indication with central tracking object 145 that peer 105 has received message 113, which is addressed to "any one" of Group A. Accordingly, any other peer in Group A that inadvertently receives a copy of message 113 can drop the message or simply avoid responding.

Accordingly, implementations of the present invention provide a number of advantages and optimizations for peer-to-peer communication systems. Embodiments and/or implementations within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a peer computer in a peer-to-peer communication system in which one or more peers communicate messages with one or more other peers in a peer group, a method of managing peer group communication within a network namespace, comprising the acts of:

identifying a first peer group of one or more peers associated in a peer-to-peer communication system, the first peer group being associated with a first namespace wherein a namespace identifies a set of names in hierarchical format;

sending a group join request message to the first namespace; and receiving a confirmation message from the first namespace that membership in the first peer group has been accepted, such that the peer has been added to a membership list of the first peer group, and such that the peer is subscribed to the first namespace, wherein the membership list for the first peer group comprises one or more peers and an identifier of a second peer group of one or more peers, the second peer group being associated with a second namespace wherein messages sent to the first peer group are forwarded to each member of the membership list such that each of the one or more peers of the first peer group and also each of the one or more peers of the second peer group receive the messages.

2. The peer-to-peer communication system as recited in claim 1, further comprising an act of sending a peer message to the first peer group by publishing the peer message to the first namespace.

3. The peer-to-peer communication system as recited in claim 1 further comprising the acts of:

storing at least a portion of the membership list for the first group at the peer computer; and sending a group join request message to the second namespace associated with the second peer group.

4. The peer-to-peer communication system as recited in claim 3, further comprising the acts of:

receiving a new confirmation message from the second namespace that membership in the second peer group has been accepted; and adding the first peer group to the membership list for the second peer group.

5. The peer-to-peer communication system as recited in claim 4, further comprising an act of creating a namespace bridge between the first and second namespace, such that peer messages sent to the first namespace are automatically chained to the second namespace.

6. The peer-to-peer communication system as recited in claim 4, wherein the peer computer is a node in the peer-topeer communication system, and wherein the at least a portion of the membership list is stored at the peer computer in a hash table.

7. In a peer-to-peer communication system in which one or more peers communicate messages with one or more other peers in a peer group, a computer program product comprising a storage medium having computer-executable instructions stored thereon that, when executed, cause one or more processors at a peer computer system to execute a method comprising the following:

identifying a first peer group of one or more peers associated in a peer-to-peer communication system, the first peer group being associated with a first namespace wherein a namespace identifies a set of names in hierarchical format;

sending a group join request message to the first namespace; and receiving a confirmation message from the first namespace that membership in the first peer group has been accepted, such that the peer has been added to a membership list of the first peer group, and such that the peer is subscribed to the first namespace, wherein the membership list for the first peer group comprises one or more peers and an identifier of a second peer group of one or more peers, the second peer group being associated with a second namespace wherein messages sent to the first peer group are forwarded to each member of the membership list such that each of the one or more peers of the first peer group and also each of the one or more peers of the second peer group receive the messages.

* * * * *